(12) United States Patent
Robinson et al.

(10) Patent No.: US 9,003,794 B2
(45) Date of Patent: *Apr. 14, 2015

(54) MULTI-STAGE TURBOCHARGER SYSTEM WITH EXHAUST CONTROL VALVE

(75) Inventors: Lee J. Robinson, Holmfirth (GB); James A. McEwen, Brighouse (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/605,264

(22) Filed: Sep. 6, 2012

(65) Prior Publication Data

US 2012/0328411 A1 Dec. 27, 2012

Related U.S. Application Data

(63) Continuation of application No. 12/718,645, filed on Mar. 5, 2010, now Pat. No. 8,307,650, which is a continuation of application No. PCT/GB2008/002999, filed on Sep. 4, 2008.

(30) Foreign Application Priority Data

Sep. 5, 2007 (GB) .................................... 0717212.5

(51) Int. Cl.
*F02B 37/013* (2006.01)
*F02B 37/18* (2006.01)
(Continued)

(52) U.S. Cl.
CPC ............ *F02B 37/013* (2013.01); *F02B 37/001* (2013.01); *F02B 37/002* (2013.01); *F02B 37/007* (2013.01); *F02B 37/16* (2013.01); *F02B 37/18* (2013.01); *F02B 37/183* (2013.01); *F02B 39/00* (2013.01); *F02B 37/004* (2013.01); *F02D 9/06* (2013.01); *Y02T 10/144* (2013.01)

(58) Field of Classification Search
USPC .......................................... 60/612, 601, 602
See application file for complete search history.

(56) References Cited

U.S. PATENT DOCUMENTS 3,370,612 A 2/1968 Holl
4,930,315 A 6/1990 Kanesaka
(Continued)

FOREIGN PATENT DOCUMENTS

DE 3735736 A1 5/1989
DE 19514572 A1 10/1996
(Continued)

OTHER PUBLICATIONS

United Kingdom Search Report, GB0717212.5, Sep. 3, 2008, Cummins Turbo Technologies Limited.
(Continued)

*Primary Examiner* — Mary A Davis
(74) *Attorney, Agent, or Firm* — Krieg DeVault LLP

(57) ABSTRACT

A turbocharger system comprises a first relatively small turbocharger and a second relatively large turbocharger connected in series and an exhaust gas flow control valve. The exhaust control valve has an inlet port communicating with the exhaust gas flow upstream of the first turbine a first outlet port communicating with the exhaust flow downstream of said first turbine but upstream of said second turbine, and a second outlet port communicating with the exhaust flow downstream of said second turbine. The valve is operable to selectively permit or block flow through the first and second outlet ports.

24 Claims, 13 Drawing Sheets

(51) Int. Cl.
  *F02D 23/00* (2006.01)
  *F02B 37/00* (2006.01)
  *F02B 37/007* (2006.01)
  *F02B 37/16* (2006.01)
  *F02B 39/00* (2006.01)
  *F02D 9/06* (2006.01)

(56) References Cited

U.S. PATENT DOCUMENTS

| | | | |
|---|---|---|---|
| 5,142,866 | A | 9/1992 | Yanagihara et al. |
| 5,408,979 | A | 4/1995 | Backlund et al. |
| 5,893,392 | A | 4/1999 | Spies et al. |
| 6,378,308 | B1 | 4/2002 | Pfluger |
| 6,802,184 | B2 | 10/2004 | Huter et al. |
| 6,976,505 | B2 | 12/2005 | MacLane |
| 7,051,527 | B2 | 5/2006 | Schmid |
| 7,165,403 | B2 | 1/2007 | Sun et al. |
| 7,255,129 | B2 | 8/2007 | Lopez |
| 7,752,844 | B2 | 7/2010 | Dietz et al. |
| 8,307,650 | B2 * | 11/2012 | Robinson et al. ............... 60/612 |
| 2003/0074899 | A1 | 4/2003 | Yamaguchi et al. |
| 2003/0188535 | A1 | 10/2003 | Mader et al. |
| 2004/0040300 | A1 | 3/2004 | Klingel |
| 2004/0134193 | A1 | 7/2004 | Klingel |
| 2006/0042247 | A1 | 3/2006 | Haugen |
| 2006/0070381 | A1 | 4/2006 | Parlow |
| 2006/0174620 | A1 | 8/2006 | Albat |
| 2011/0123315 | A1 | 5/2011 | Robinson |

FOREIGN PATENT DOCUMENTS

| | | |
|---|---|---|
| DE | 197 40 609 A1 | 12/1998 |
| DE | 19740609 A1 | 12/1998 |
| DE | 10222919 A1 | 12/2003 |
| DE | 10 2005 025885 A1 | 12/2006 |
| DE | 102005025885 A1 | 12/2006 |
| EP | 0864737 A1 | 9/1998 |
| EP | 0949411 A2 | 10/1999 |
| EP | 1258603 A1 | 11/2002 |
| EP | 1 375 868 | 1/2004 |
| EP | 1375868 A1 | 1/2004 |
| JP | 61200331 A | 9/1986 |
| JP | 62265422 | 11/1987 |
| JP | 63009616 A | 1/1988 |
| JP | 2005315163 A | 11/2005 |
| JP | 2007-154684 | 6/2007 |
| JP | 2007154684 | 6/2007 |
| JP | 2007154684 A * | 6/2007 |
| WO | 2004042206 A1 | 5/2004 |
| WO | 2006089653 A1 | 8/2006 |
| WO | WO 2006/089653 A1 | 8/2006 |
| WO | 2007031752 A1 | 3/2007 |
| WO | 2007031752 A1 | 3/2007 |
| WO | WO 2007/031752 A1 | 3/2007 |
| WO | 2007098133 A1 | 8/2007 |
| WO | WO 2007/098133 | 8/2007 |
| WO | 2008015397 | 2/2008 |
| WO | WO 2008/015397 A1 | 2/2008 |

OTHER PUBLICATIONS

International Search Report, PCT/GB2008/002999, Mar. 11, 2009, Cummins Turbo Technologies Limited.
UK Intellectual Property Office. Search Report Under Section 17. Patent Application GB0717222.5. Sep. 3, 2008. Cummins Turbo Technologies Ltd.
European Patent Office. International Search Report. Patent Application PCT/GB2008/002999. Mar. 11, 2009. Cummins Turbo Technologies Ltd.
European Patent Office. Written Opinion. Patent Application PCT/GB2008/002999. Mar. 11, 2009. Cummins Turbo Technologies Ltd.

* cited by examiner

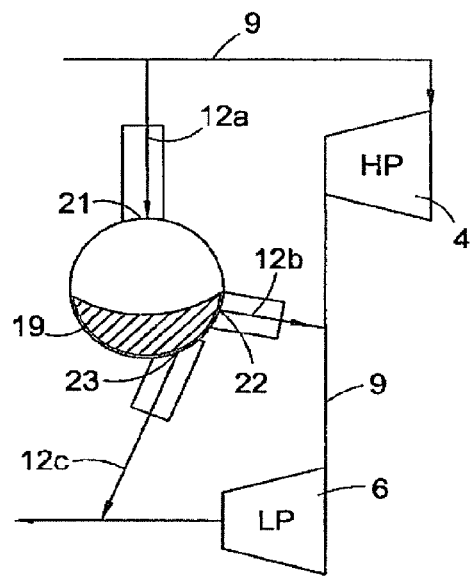
Fig. 2a
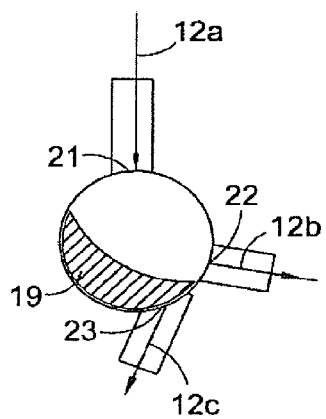 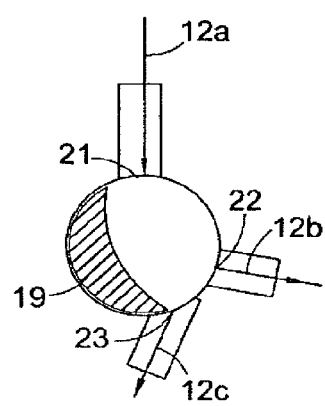
Fig. 2b              Fig. 2c

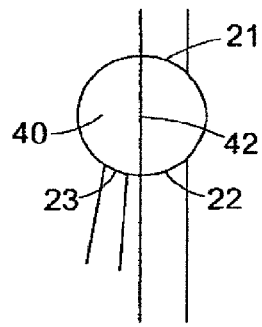
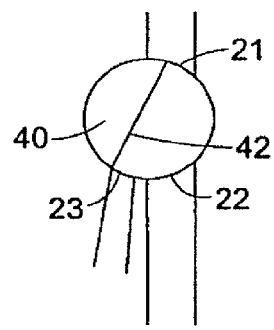
Fig. 6a                     Fig. 6b
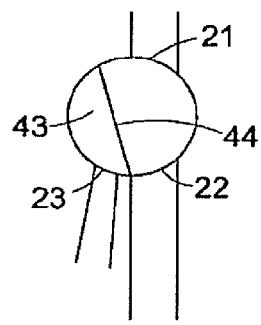
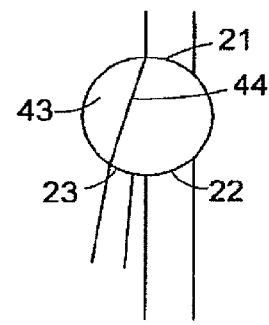
Fig. 6c                     Fig. 6d
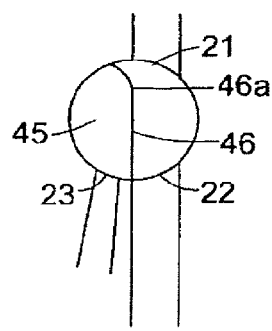
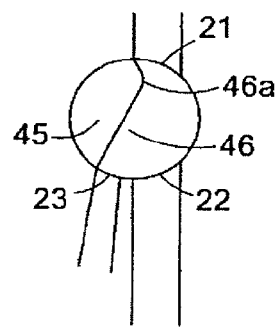
Fig. 6e                     Fig. 6f

MULTI-STAGE TURBOCHARGER SYSTEM WITH EXHAUST CONTROL VALVE

CROSS REFERENCE TO RELATED APPLICATIONS

The present application is a continuation of U.S. patent application Ser. No. 12/718,645 filed Mar. 5, 2010, now U.S. Pat. No. 8,307,650, which is a continuation of PCT/GB2008/002999 filed Sep. 4, 2008, which claims priority to United Kingdom Patent Application No. 0717212.5 filed Sep. 5, 2007, each of which are incorporated herein by reference in their entirety.

The present invention relates to a multi-stage turbocharger system. Particularly, but not exclusively, the present invention relates to a two stage turbocharger system.

Turbochargers are well known devices for supplying air to the intake of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housings.

In known turbochargers, the turbine stage comprises a turbine chamber within which the turbine wheel is mounted; an annular inlet passageway defined between facing radial walls arranged around the turbine chamber; an inlet arranged around the inlet passageway; and an outlet passageway extending from the turbine chamber. The passageways and chambers communicate such that pressurised exhaust gas admitted to the inlet chamber flows through the inlet passageway to the outlet passageway via the turbine and rotates the turbine wheel. It is also known to improve turbine performance by providing vanes, referred to as nozzle vanes, in the inlet passageway so as to deflect gas flowing through the inlet passageway towards the direction of rotation of the turbine wheel.

A known approach to improving turbocharging efficiency for an engine with a wide speed/load range is to provide a sequential two stage turbocharging system, comprising one relatively small high pressure turbocharger and another relatively large low pressure turbocharger. The turbochargers are arranged in series so that exhaust from the engine flows first through the smaller turbine of the high pressure turbocharger and then through the larger turbine of the low pressure turbocharger. A valve controlled bypass passage is provided for allowing exhaust gas to bypass the high pressure turbine at high engine speeds and/or loads. Similarly, the compressors of the two turbochargers are also arranged in series, with air flowing first through the relatively large compressor of the low pressure turbocharger and then through the relatively small compressor of the high pressure turbocharger. Again, a valve controlled bypass is provided to allow the inlet air to bypass the compressor of the high pressure turbocharger at high engine speeds and/or loads.

It is an object of embodiments of the present invention to provide an alternative or improved multi-stage turbocharger system.

According to the present invention there is provided a turbocharger system comprising: a first relatively small turbocharger; a second relatively large turbocharger; the first turbocharger comprising a first exhaust turbine situated in a first exhaust passage; the second turbocharger including a second exhaust turbine situated in said first exhaust passage downstream of said first turbine; an exhaust gas flow control valve including; an inlet port communicating with the first exhaust gas passage upstream of the first turbine; a first outlet port communicating with the first exhaust gas passage downstream of said first turbine but upstream of said second turbine; a second outlet port communicating with said first exhaust gas passage downstream of said second turbine; wherein the valve is operable to selectively permit or block flow through the first and second outlet ports.

In accordance with the present invention the exhaust gas control valve is operable to selectively permit exhaust gas flow to bypass the first turbine only, or to bypass both the first and second turbines. As such the valve is operable both as a first turbine bypass valve, and also as a "wastegate" valve for the second turbine.

In preferred embodiments of the invention the valve is operable in a first mode to block flow through both the first and second outlet ports, a second mode in which flow is permitted through the first outlet port to allow at least a portion of the exhaust gas flow to bypass the first turbine alone, and a third mode in which flow is permitted through said second outlet port to allow at least a portion of the exhaust gas flow to bypass both the first and second turbines.

To permit flow through the first and second outlet ports, the respective port may be partially or fully unobstructed. In this context, "fully unobstructed" is to be understood to be the maximum extent to which the port may be opened having regard to the normal operation of the valve.

Preferably the exhaust flow control valve is a rotary valve comprising a valve rotor which is rotatable about a valve axis to selectively block or unblock said first and second outlet ports.

In accordance with further embodiments of the invention the turbocharger system may further comprise an exhaust brake valve situated in the first exhaust passage. As will be appreciated by those skilled in the art, an exhaust brake valve is a valve situated downstream of the engine outlet manifold. Under certain engine operating conditions the valve may be closed so as to restrict flow through the valve. The restriction of flow through the valve constrains the flow of exhaust gases from the engine outlet manifold and, as such, creates back-pressure in the engine manifold and engine cylinders due to compression of the exhaust gases. The back-pressure results in a braking force being applied to the engine.

A common type of valve used as an exhaust brake valve is a butterfly valve. However, as will be appreciated by those skilled in the art, any appropriate valve type may be used, such as a flap valve or a rotary valve.

In some embodiments of the present invention the exhaust brake valve is movable between an open position, in which flow through the exhaust brake valve is at least substantially unobstructed; and a closed position, in which flow through the exhaust brake valve is at least substantially prevented. The exhaust brake valve may be such that it is movable to one or more positions between the open and closed positions so as to select a desired a through-flow. However, in other embodiments the exhaust brake valve may be movable only between the open and closed positions so that the exhaust brake valve effectively has and an 'on/off' functionality. In such embodiments, modulation of the exhaust braking force may be provided by appropriate control of the exhaust gas flow control valve. This may be advantageous in that the exhaust brake valve may require reduced control complexity and be of reduced weight and size when compared to other embodiments.

It will be appreciated that when the exhaust brake valve is in an open position in which flow through the exhaust brake valve is at least substantially unobstructed, the flow through the valve may be completely unobstructed; and that when the exhaust brake valve is in a closed position, in which flow through the exhaust brake valve is at least substantially prevented, the flow through the valve may be completely blocked.

In accordance with the present invention the exhaust brake valve may be situated upstream of the first exhaust turbine and downstream of a junction communicating with the inlet port of the exhaust gas flow control valve. This may be advantageous in certain embodiments as the first turbine will not be exposed to any back-pressure caused by the exhaust brake valve. In alternative embodiments of the invention the exhaust brake valve may be situated downstream of the first exhaust turbine. In such embodiments the exhaust brake valve may be upstream of a junction communicating with the second outlet port of the exhaust gas flow control valve. In further embodiments of the invention the exhaust brake valve may be situated upstream of a junction communicating with the first outlet port of the exhaust gas flow control valve.

A junction as discussed above may for instance be defined between the first exhaust passage and a conduit communication with the exhaust gas flow control valve, or may be defined by a respective port of the exhaust gas flow control valve opening directly into the first exhaust passage.

The present invention also provides a method of operating a turbocharger system according to any preceding claim, the method comprising:
(i) Operating the valve in a first mode to divert all exhaust gas flow through the first turbine;
(ii) Operating the valve in a second mode to allow at least a portion of the exhaust gas flow to bypass the first turbine; and
(iii) Operating the valve in a third mode to allow exhaust gas flow to bypass the first turbine, and in addition allow at least a portion of the exhaust gas flow to bypass the second turbine.

If the turbocharger system includes an exhaust brake valve, as described above, the method may further comprise:
(i) Closing the exhaust brake valve so as to at least substantially prevent flow through the exhaust brake valve; and
(ii) Operating the exhaust gas flow control valve in an exhaust braking mode to allow at least a portion of the exhaust gas flow to bypass the exhaust brake valve.

The exhaust gas flow control valve may be operated to modulate the amount of exhaust gas flow allowed to bypass the exhaust brake valve by regulating the exhaust gas flow through any of the following:
(i) The inlet port of the exhaust gas flow control valve;
(ii) The first outlet port of the exhaust gas flow control valve; and
(iii) The second outlet port of the exhaust gas flow control valve.

According to a further aspect of the present invention there is provided a turbocharger system comprising a first relatively small turbocharger; and a second relatively large turbocharger; the first turbocharger comprising a first exhaust turbine situated in a first exhaust passage; the second turbocharger including a second exhaust turbine situated in said first exhaust passage downstream of said first turbine; a bypass gas passage communicating with the first exhaust gas passage at a first junction upstream of the first turbine and at a second junction downstream of the first turbine; and an exhaust gas flow control valve located in the bypass passage; wherein the exhaust gas flow control valve is operable to selectively permit or block flow through the bypass gas passage; the turbocharger system further comprising an exhaust brake valve situated in the first exhaust gas passage between the first and second junctions.

In some embodiments the exhaust brake valve may be situated between the first junction and the first turbocharger. Alternatively, the exhaust brake valve may be situated between the first turbocharger and the second junction.

The exhaust gas flow control valve is preferably a valve having an inlet port, first outlet port and second outlet port as described above. However, in other embodiments the exhaust gas flow control valve may have a conventional form such as a butterfly valve or flap valve (including for instance known valves used to bypass a high pressure turbine in a known two-stage turbocharger system).

If the turbocharger system comprises a bypass gas passage and an exhaust brake valve, as described above, the present invention also provides a method of operating a turbocharger system, the method comprising operating the turbocharger system in an exhaust braking mode in which the exhaust braking valve is closed to at least substantially block flow through the first passage and the exhaust gas flow control valve is operated to control flow through the bypass gas passage so to modulate the braking force.

Specific embodiments of the present invention will now be described, by way of example only, with reference to the accompanying drawings, in which:

FIG. 1 is a schematic illustration of a two-stage turbocharging system according to a first embodiment of the present invention;

FIGS. 2a to 2c schematically illustrate operation of an exhaust flow control valve according to the present invention;

Figure 1:
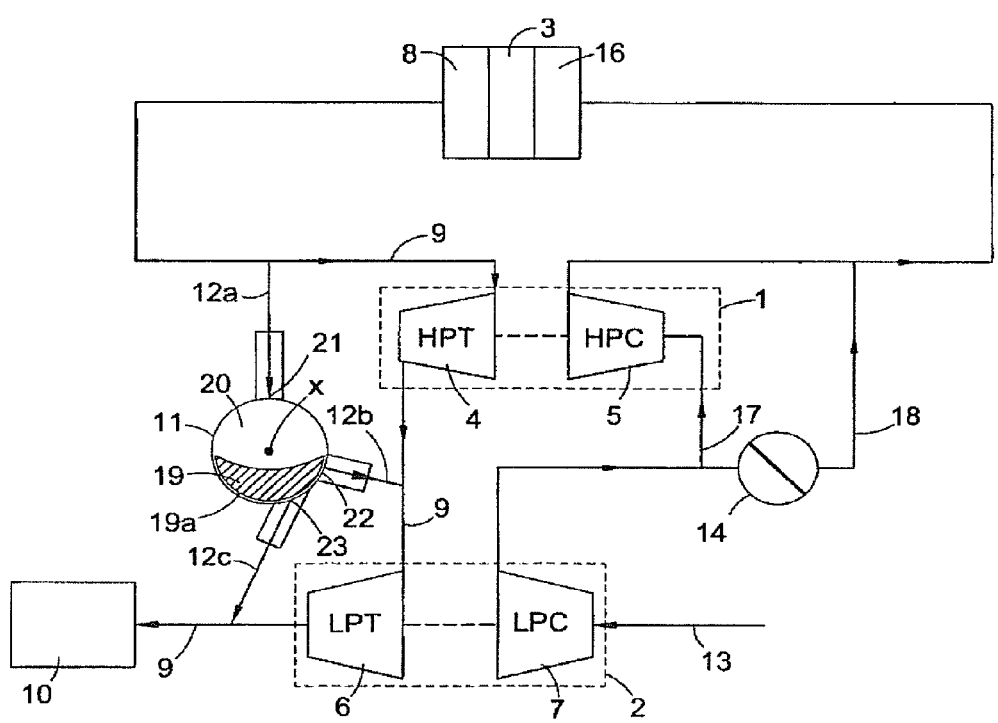
Figure 3:
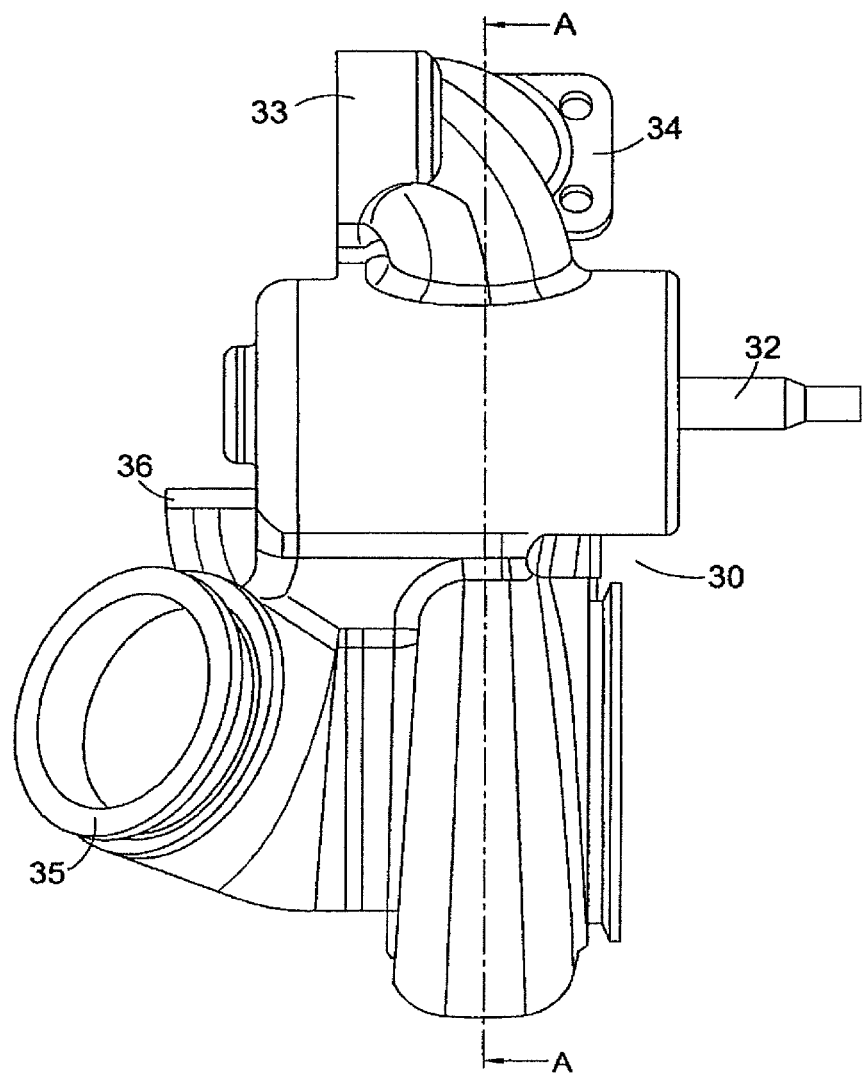
FIG. 3 is a side view of a turbine housing including a exhaust flow control valve in accordance with the present invention.
Figure 7:
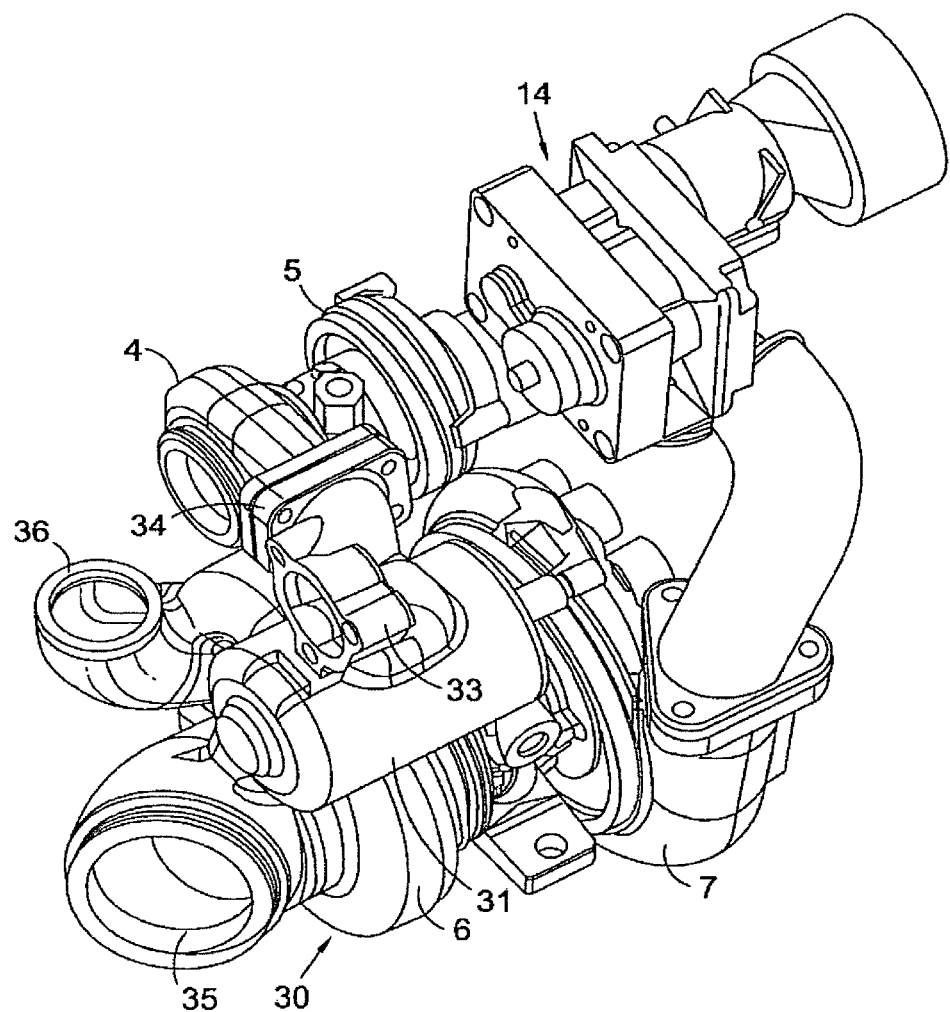
Figure 8:
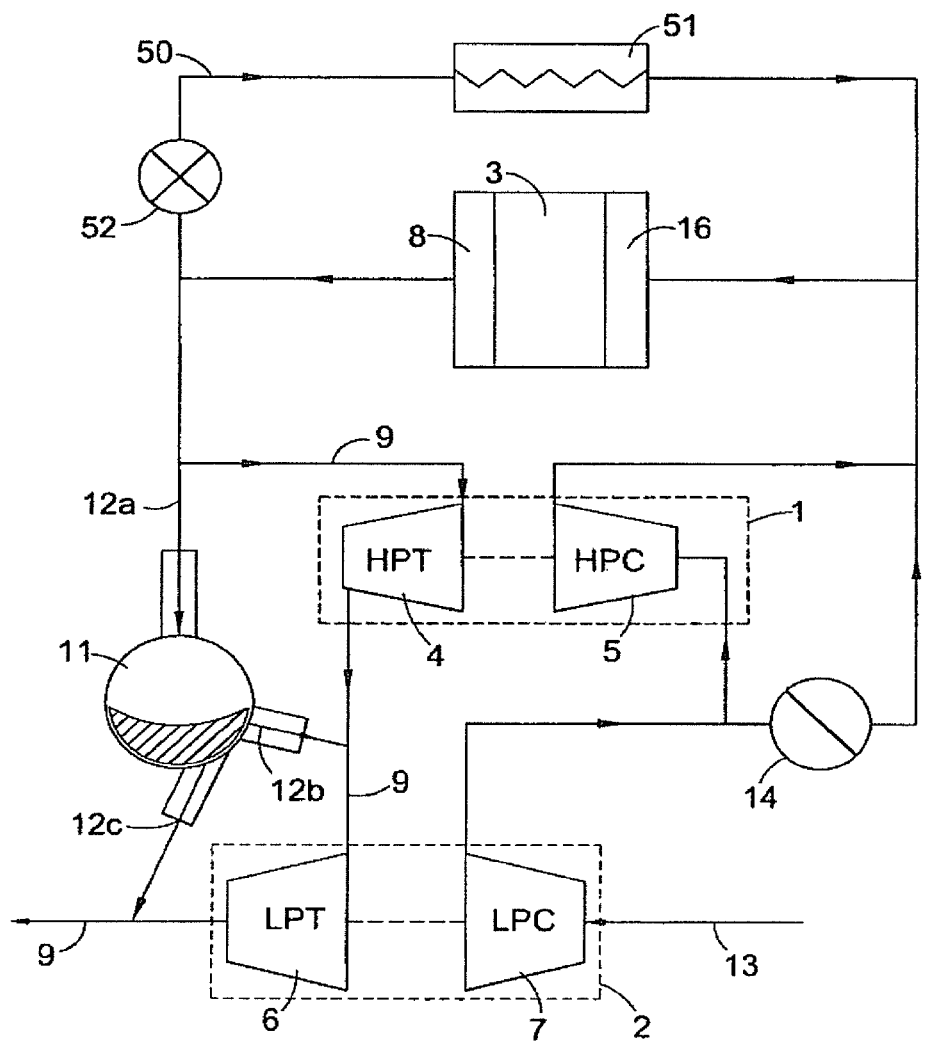
Figure 9:
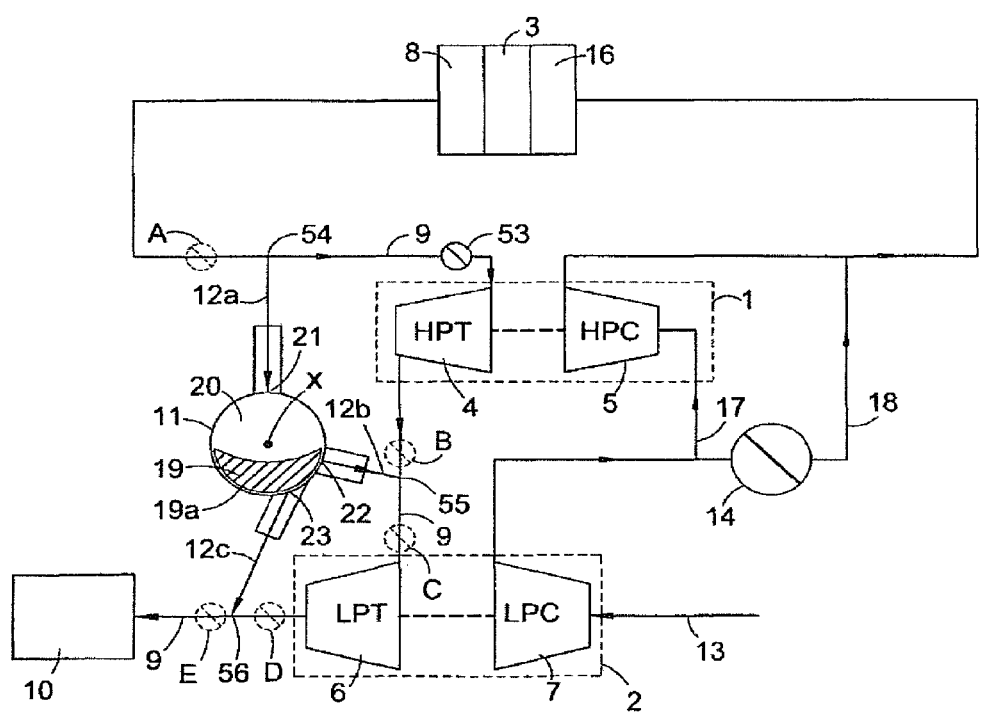
Figure 10:
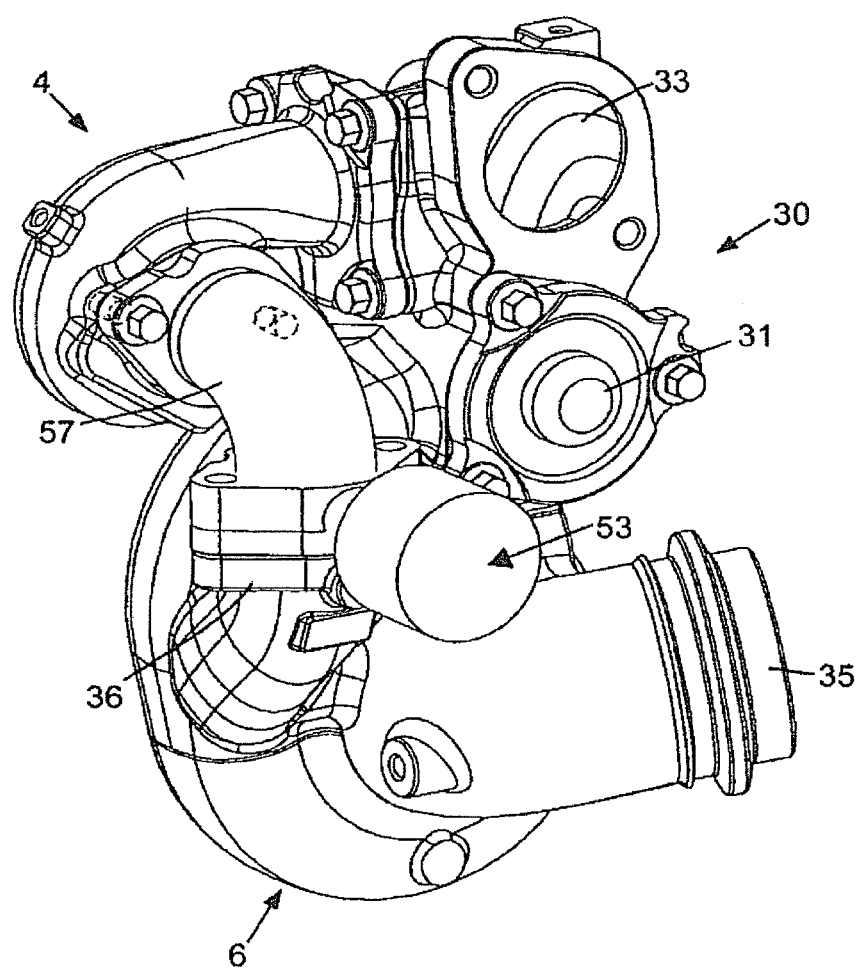
Figure 11:
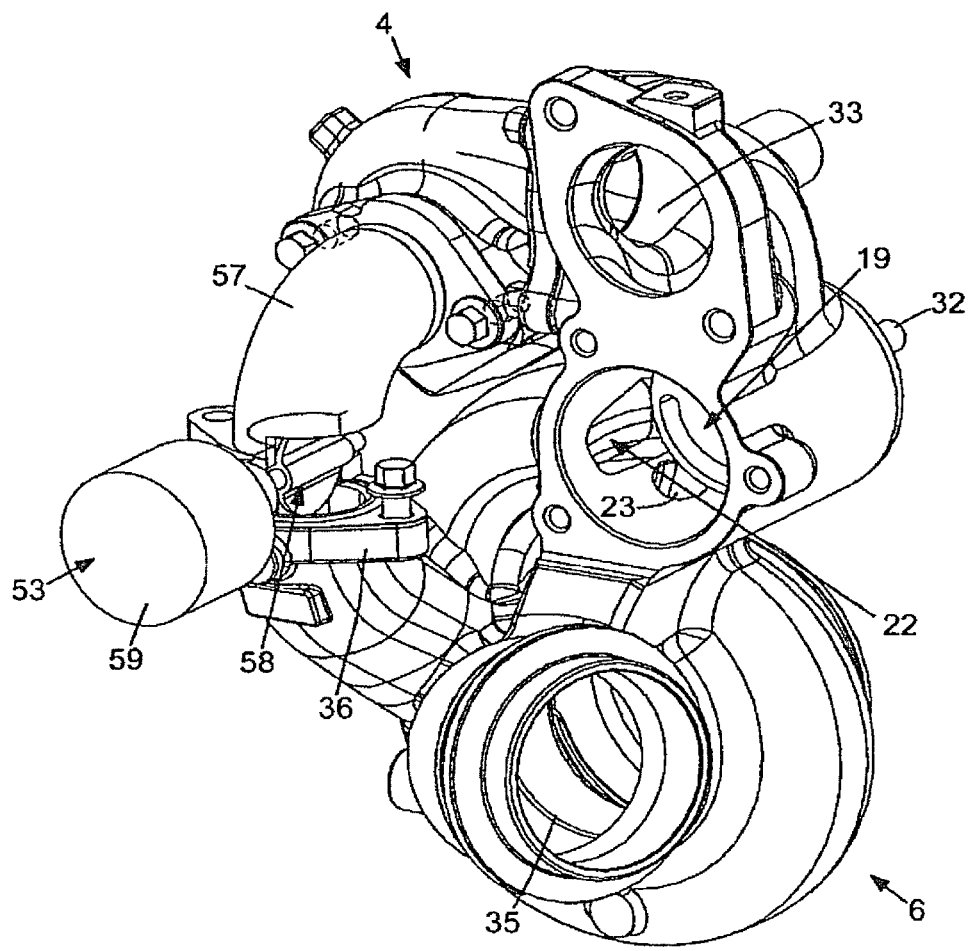
Figure 12:
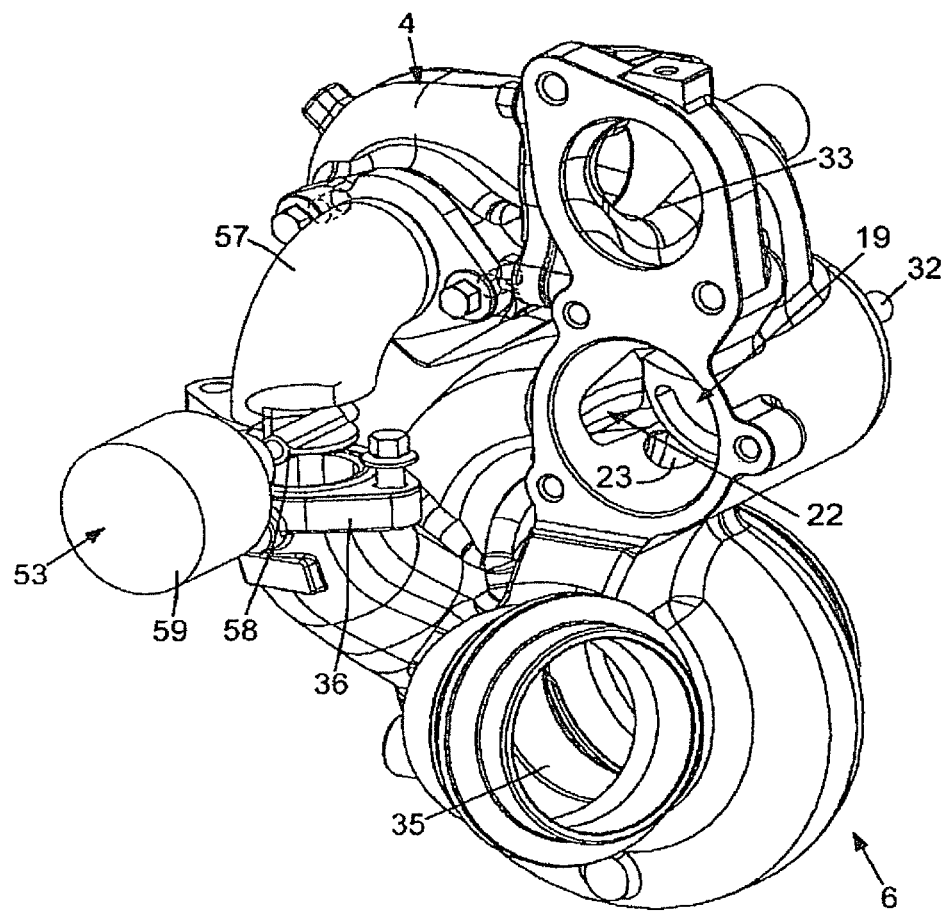

FIGS. 6a to 6f schematically illustrates examples of alternative valve rotor cross-sections;

FIG. 7 is a perspective illustration of a turbocharging system according to the present invention, incorporating the turbine housing of FIG. 3;

FIG. 8 schematically illustrates application of the turbocharging system of FIG. 1 or FIG. 7 to an engine with an EGR system;

FIG. 9 schematically illustrates a turbocharging system according to the present invention, further comprising an exhaust braking valve;

FIG. 10 is a perspective view of the turbine housing shown in FIG. 3, further comprising an exhaust braking valve according to the present invention;

FIG. 11 is a further perspective view of the embodiment of the invention shown in FIG. 10, portions of which have been cut away for clarity, the exhaust braking valve being in an open position;

FIG. 12 is a further perspective view of the embodiment of the invention shown in FIG. 10, portions of which have been cut away for clarity, the exhaust braking valve being in a closed position; and FIGS. 13a to 13e schematically illustrate operation of an exhaust flow control valve according to embodiments of the present invention, including that shown in FIG. 9.

Referring first to FIG. 1, the schematically illustrated sequential two stage turbocharging system comprises a relatively small high pressure (HP) turbocharger 1 and a relatively large low pressure (LP) turbocharger 2 connected in series to an internal combustion engine 3 such as a diesel engine. The HP turbocharger 1 comprises a relatively small exhaust turbine 4 and a relatively small compressor 5. The LP turbocharger 2 comprises a relatively large exhaust turbine 6 and a relatively large compressor 7.

Exhaust gas flows through the turbocharger system from an exhaust manifold 8 of the engine 3, via a first exhaust gas flow path 9. The flow path 9 directs exhaust gas flow first through the upstream HP turbine 4 and then through the downstream LP turbine 6. Exhaust gas flow leaving the LP turbine 6 along flow path 9 may be fed to a conventional exhaust system 10 which may for instance include an exhaust after-treatment system. The after-treatment system may be one of a variety of types of after-treatment system, including conventional systems generally known to one or ordinary skill in the art. Types of after-treatment systems contemplated include those designed to remove particulates, nitrogen-oxide compounds, and other regulated emissions.

An exhaust gas flow control valve 11 is provided in a bypass gas path 12a/12b to allow at least a portion of the exhaust gas flow to bypass the HP turbine 4 and flow straight to the LP turbine 6 under certain operating conditions. In accordance with the present invention the control valve 11 is also operable to function as a wastegate for the LP turbine 6, allowing some of the bypass gas flow to bypass both the HP turbine 4 and the LP turbine 6. This is described in detail further below.

The turbocharging system delivers compressed air to the engine (including any after cooler as appropriate) via an air inlet 13 to the LP compressor 7. An air flow control valve 14 is provided to control the flow from the LP compressor outlet path 15 to the engine intake manifold 16 (via any after-cooler etc). The air flow control valve 14, which may for instance be a conventional butterfly valve (or other valve type such as a rotary valve, gate valve, flap valve, poppet etc), is operable to control air flow along two possible downstream flow paths, a first flow path 17 via the HP compressor 5, and a second, bypass, flow path 18 which allows the air flow to bypass the HP compressor 5. The air flow control valve 14 can thus be controlled (for instance by the engine management system electronic control unit-ECU) to allow air flow to bypass the HP turbocharger 1 at the same time as the exhaust gas control valve 11 is operated to allow exhaust gas flow to the LP turbocharger 2 to bypass the HP turbocharger 1.

FIG. 1 includes a schematic cross-section through the exhaust control valve 11 which is a rotary valve comprising a valve rotor 19, having an axis of rotation X (extending into the paper with respect to FIG. 1) within a substantially cylindrical valve chamber 20. The valve rotor 19 is formed generally as a sector of a cylinder effectively defining a valve passage through the valve chamber 20. The radially outer surface 19a of the rotor forms an arc of a cylinder so as to rotate freely within the cylindrical valve chamber 20. This general form of valve is sometimes referred to as a rotary plug valve.

The valve chamber 20 has three ports, a single inlet port 21 and two outlet ports 22 and 23. The inlet port 21 communicates with an upstream portion 12a of the bypass path which in turn communicates with the exhaust gas flow path 9 upstream of the HP turbine 4. A first outlet port 22 communicates with a first downstream portion 12b of the bypass path which in turn communicates with the flow path 9 downstream of the HP turbine 4 but upstream of the LP turbine 6. A second outlet port 23 communicates with a second downstream bypass path portion 12c which in turn communicates with the flow path 9 downstream of the LP turbine 6. The bypass path portions 12a and 12b thus together provide a bypass around the HP turbine 4, and the bypass portions 12a and 12c together provide a bypass around both the HP and LP turbines 4 and 6. As indicated above, the bypass path 12a/12c effectively provides a wastegate for the LP turbine 6

Flow through the HP bypass path 12a/12b and the LP bypass path 12/12c is controlled by rotation of the valve rotor 19 about the axis X within valve chamber 20 to block or unblock the outlet ports 22 and 23 respectively. The movement and positioning of the valve rotor 19 will typically be controlled by the ECU, according to one or more control regimes. For instance, the position of the valve rotor 19 may be controlled in response to engine speed and/or load, the speed of the HP and/or LP turbines, or the boost pressure produced at the engine inlet manifold 16 by the turbocharger system. Exemplary modes of operation of the turbocharging system including the exhaust gas control valve 11 are described below with reference to FIGS. 2a, 2b and 2c.

Referring first to FIG. 2a, this illustrates a position of the valve rotor 19 appropriate for instance for exhaust flow control at low engine speeds and/or loads when there is low exhaust mass flow. Both valve outlet ports 22 and 23 are fully closed by the surface 19a of the valve rotor 19 thereby closing both HP and LP bypass paths 12a/12b and 12a/12c respectively so that the exhaust gas flowing from the engine manifold 8 must flow along the flow path 9 through the HP turbine 4 and then through the LP turbine 6. The air flow bypass valve 14 will also be closed, or substantially closed, to force air flow through the HP compressor 5 (in practice it is beneficial to close the compressor bypass valve 14 before the turbine bypass is closed to provide load on the HP compressor which will prevent HP turbocharger overspeed as the turbine bypass is closed). Due to the relatively small size of the HP turbine 4 the gas flowing through it reaches a relatively high speed and thus rotates the HP turbine 4 (and consequentially HP compressor 5) at a relatively high speed, thereby producing substantial boost pressure despite a relatively low exhaust mass flow rate. Because of its relatively large size the LP turbine 6 rotates very little so that the LP compressor 7 produces only marginal boost.

With the valve rotor 19 in the position shown in FIG. 2a, the division of work between the HP and the LP turbines is a function of the relative flow areas of each turbine. The HP turbine 4 provides the majority of the work and operating at a much higher expansion ratio than the larger LP turbine 6. If engine speed and/or load increases with the valve rotor 19 in the portion shown in FIG. 2a, the expansion ratio of both turbines will increase, but the HP turbocharger will continue to provide most of the boost pressure (provided its effective expansion ratio limit is not exceeded).

As the engine speed and/or load increases, the valve rotor 19 may be rotated to uncover part, or all, of the first outlet port 22 to permit at least a portion of the exhaust gas flow to flow through the HP bypass path 12a/12b and thereby bypass the HP turbine 4. FIG. 2a illustrates the valve rotor 19 in a position in which the port 22 (and port 23) is fully covered, and FIG. 2b shows the valve rotor 19 rotated to a position in which the port 22 is completely uncovered but port 23 remains covered. By controlling the position of the valve rotor 19 between the two positions shown in FIGS. 2a and 2b, it is possible in accordance with the present invention to modulate the HP bypass gasflow through the HP bypass gas path 12a/12b. For instance, as the engine speed begins to rise from a low speed and/or load condition, the valve rotor 19 may be rotated to begin to open the valve port 22 to permit some exhaust gas flow to bypass the HP turbine so that an increasing amount of work is done by the LP turbocharger as the engine speed and/or load rises.

The precise position of the valve rotor 19 may be controlled in accordance with a variety of different operating control strategies. For example, the valve 11 may be operated to maintain a particular expansion ratio across the HP turbine 4, either to maintain the HP turbine 4 at a constant expansion ratio or at an expansion ratio within an acceptable range for particular operating conditions of the engine. The valve 11 could alternatively or additionally be operated in order to maintain the HP turbine 4 speed within a certain range, or below a certain maximum to prevent over-speed. According to another possible control strategy, the valve 11 could be operated to generate a desired boost pressure at the engine intake manifold 16 or to maintain the boost pressure within a desired range (e.g. above a minimum and/or below a maximum). The provision of appropriate sensors, such as turbocharger speed or boost pressure sensors, to provide appropriate control signals to the ECU will be straightforward as will be appreciated by the appropriately skilled person. The sensors might typically include sensors for monitoring engine speed and/or load, turbocharger speed, boost pressure produced by each turbocharger, boost pressure generated at the engine intake and back pressure generated within the exhaust flow path upstream of the control valve 11.

As the engine speed and/or load rises and the valve rotor 19 is rotated further towards the position shown in FIG. 2b in which the valve port 22 is fully open, work done by the LP turbocharger relative to the HP turbocharger increases. Depending upon the particular control strategy for the bypass exhaust gas flow modulation, the overall pressure ratio of the turbocharger system may for instance rise or remain constant as the expansion ratio across the larger LP turbine increases.

It will be appreciated that as the HP bypass path 12a/12b is opened by rotation of the valve rotor 19, the HP compressor bypass valve 14 may also be opened as an increasing amount of boost is provided by the LP compressor. The overall boost pressure produced by the turbocharging system may rise, or may remain constant, as the HP bypass path 12a/12b is opened depending upon the particular control regime for the control valve 11 and bypass valve 14.

At high engine load and/or speed, at which the valve rotor 19 is moved to the position shown in FIG. 2b in which the HP bypass path 12a/12b is fully open, the turbocharging system again functions effectively as a single turbocharger system, with virtually all of the work now being done by the larger LP turbocharger. At this point the HP compressor bypass valve 14 will typically be fully open to bypass the HP compressor 5. There will, however, still be some exhaust gas flow through the HP turbine as there will be a pressure difference across it. Although this would produce negligible work, it will nevertheless ensure that the HP turbine 4 continues to rotate to help provide a smooth transfer of work with little turbo-lag in the HP turbocharger as engine conditions change and the valve 11 is operated to reduce the bypass flow, transferring compression work to the HP turbocharger.

The present invention thus provides a turbocharger system including an exhaust gas flow control valve which can be operated precisely to modulate the exhaust gas flow to the HP and LP turbochargers in varied operating conditions, and in accordance with various possible control regimes. In accordance with the present invention the valve can also be operated to provide a wastegate function for the LP turbine 6 as mentioned above and described further below.

Once the port 22 is fully uncovered so that the HP bypass path 12a/12b is fully open virtually all of the work is being done by the LP turbocharger. If engine speed and engine load continues to rise the LP turbine may reach its boost pressure design limit, exceeding which could lead to overspeed of the LP turbine. This problem could be addressed by providing the LP turbine with a separate wastegate valve operable in a conventional manner to provide a bypass path around the LP turbine as boost pressure limits are reached. Various forms of wastegate valve of this general type are known in the art, including for instance poppet valve arrangements operated by a pneumatic or electric actuator either in direct response to the rise of boost pressure in the LP compressor (typical in the case of a pneumatic actuator) or operated under the control of the ECU in response to a design control regime programmed into the ECU. However, in accordance with the present invention such a separate wastegate valve is not necessary. Rather, as higher engine speed and engine loads are reached, the valve rotor 19 may be rotated further to at least partially uncover the outlet port 23 to allow a portion of the exhaust gas flow to flow through the LP bypass path 12a/12c. Thus, the LP bypass path 12a/12c effectively operates as an LP wastegate.

FIG. 2c shows the wastegate 12a/12c almost fully opened. It will be appreciated that by controlling the precise position of the rotor 19 to vary the degree to which the port 23 is uncovered the wastegate 12a/12c can be controlled as required to limit the boost pressure of the LP turbine. As with operation of the valve described above in relation for FIGS. 2a and 2b, the position of the valve rotor 19 may be controlled via the ECU in accordance with any appropriate operating regime.

Whereas the HP bypass path 12a/12b will typically be configured so that when fully open virtually all of the exhaust gas flow will bypass the HP turbine, the LP wastegate 12a/12c does not necessarily need to be able to pass the entire exhaust gas flow since some exhaust gas flow through the LP turbine will be required to generate boost pressure. The wastegate 12a/12c is either configured so that when fully open (at which point the HP bypass path 12a/12c will also be fully open) neither the LP or the HP turbine will overspeed.

The present invention provides a multi-stage turbocharging system in which the functionality of a HP turbine bypass valve and an LP turbine wastegate are combined into a single exhaust gas flow control valve. This reduces the components and associated complexity and cost that is required in a turbocharging system which has separate HP bypass and LP wastegate valve arrangements.

The exhaust gas control valve 11 according to the present invention can be housed externally of the LP turbocharger (in an appropriate housing), or can be conveniently housed in a suitably adapted LP turbine housing. An example of such an LP turbine housing is shown in FIG. 3 and FIGS. 5a to 5c.

Referring first to FIG. 3, this illustrates an LP turbine of a turbocharging system according to the present invention in which the exhaust control valve is housed within a suitably adapted LP turbine housing 30. The turbine housing 30 is modified to define a control valve housing 31. A valve rotor spindle 32 extends from the housing for connection to an appropriate valve actuator (not shown). Also visible in FIG. 3 is a manifold 33 for connection to the engine exhaust manifold 8, a manifold 34 for connection to the inlet of the HP turbine, the LP outlet 35, and a part of the LP inlet manifold 36 for connection to the HP turbine outlet.

Figure 4:
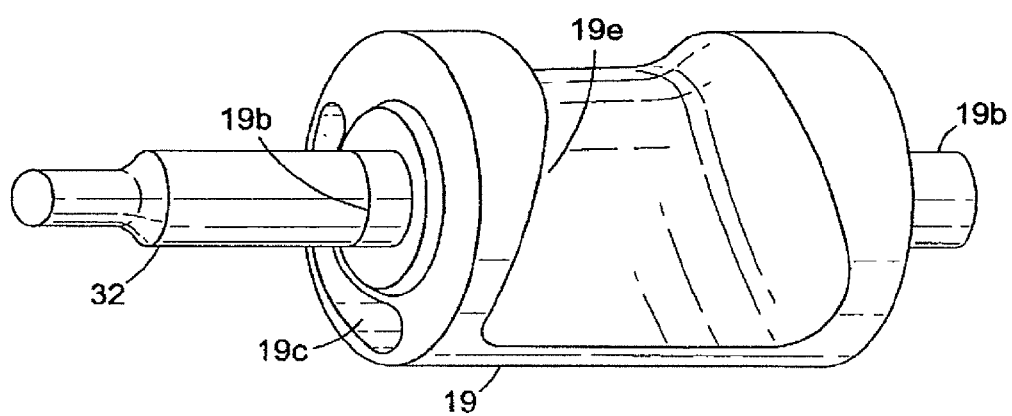
FIG. 4 is a perspective illustration of a valve rotor of the exhaust flow control valve of the turbine shown in FIG. 3, according to an embodiment of the present invention.

A perspective view of a one embodiment of a valve rotor 19 suitable for the turbine of FIG. 3 is shown in FIG. 4. At either axial end of the rotor 19 is a shaft 19b defining the axis X and permitting the valve rotor to be rotatably mounted within the valve housing 31. The particular rotor illustrated has an internal bore 19b to reduce the weight of the rotor. The valve rotor 19 of FIG. 4 is generally cylindrical with a cutaway section which effectively defines a valve passage 19e. The precise configuration of the valve passage 19e is to some extent influenced by the location of the various valve ports, and having regard to compromises that may be made in optimising the exhaust gas flow for all operating positions of the valve rotor.

Appropriate bearing arrangements (not shown) for mounting of the rotor 19 within the valve housing 31, and appropriate valve actuating mechanisms (not shown), will be known to the skilled person. For instance the actuator may be an electric actuator, such as for example a stepper motor or other rotary electric actuator, or may comprise a pneumatic or hydraulic actuator or any other form of actuator. An actuator may be directly connected to valve rotor spindle 32 which extends from one of shafts 19b. The actuator may be directly connected to the rotor 19 or connected to the rotor via a gear box or the like. Various possible coupling arrangements will be apparent to the appropriately skilled person.

Figure 5A:
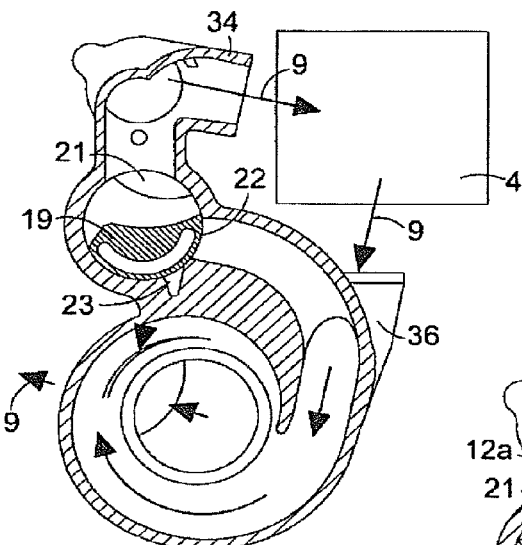
FIGS. 5a to 5c are cross-sections of the turbocharger of FIG. 3 illustrating valve rotor positions corresponding to those illustrated schematically in FIGS. 2a to 2c.
Figure 5B:
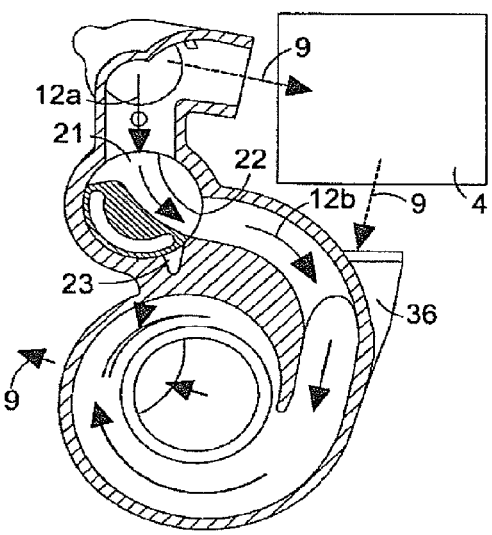
Figure 5C:
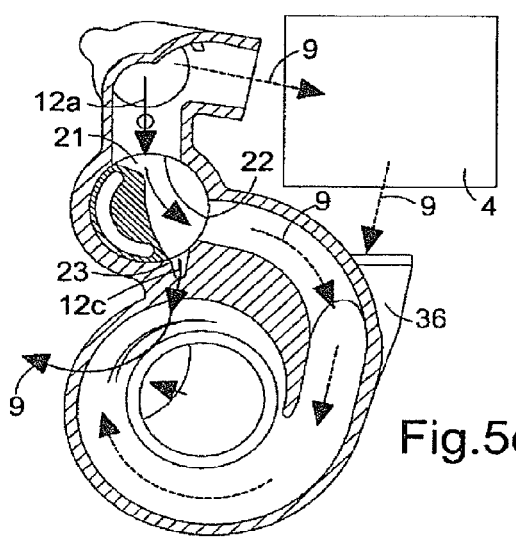

FIGS. 5a to 5c are cross-sections of the LP turbine housing of FIG. 3 (including the rotor 19 of FIG. 4) taken on the line A-A of FIG. 3. The HP turbine 4 and its connection to the LP turbine is shown schematically. The rotor 19 can be seen located within a valve chamber 20 defined by the valve housing 31. Also visible are the valve ports 21, 22 and 23. The valve port 21 opens to the bypass path portion 12a, the valve port 22 opens to the bypass path portion 12b, and the valve port 23 opens to the bypass path portion 12c. The bypass path portion 12c does not extend exactly radially and so its communication with the exhaust path 9 downstream of the LP turbine is not visible in FIGS. 5a to 5c as it extends at an angle into the paper. In addition, although the port 23 appears significantly smaller than ports 21 and 22, it is in fact elongated in a direction extending into the paper so is larger than appears to be the case.

In FIGS. 5a and 5b the valve rotor 19 is shown in positions corresponding generally to the positions of the valve rotor shown in FIGS. 2a and 2b. FIG. 5c shows the valve rotor 19 in a position corresponding to the position shown in FIG. 2c. Thus, FIG. 5a shows the valve rotor position with the bypass path fully closed so that all of the exhaust gas flow is directed along exhaust flow path 9 to the HP turbine (the position of which is generally indicated in FIGS. 5a to 5c) and then on to the LP turbine inlet 36. FIG. 5b shows the valve rotor rotated into a position to provide full HP turbine bypass through the HP bypass path 12a/12b. A small flow through the HP turbine will still exist as indicated by the dotted lines. FIG. 5c shows the valve rotor in a position in which the LP bypass path, i.e. the LP wastegate, is fully open to allow some exhaust gas flow to bypass both the HP and the LP turbines.

As indicated above, the configuration of the rotor 19 is designed as a compromise to provide acceptable flow efficiency throughout the rotational range of the valve rotor. This will be explained further with reference to FIGS. 6a to 6f.

FIGS. 6a and 6b schematically illustrate a valve rotor 40 housed within a valve chamber 41 having an inlet port 21 communicating with bypass flow passage portion 12a, a first outlet port 22 communicating with bypass flow passage portion 12b, and a second outlet port 23 communicating with a bypass flow passage portion 12c. As above, the bypass path portions 12a/12b together define a HP turbine bypass, and the bypass path portions 12a/12c together define an LP bypass path, or LP wastegate. The valve rotor 40 has a simple cross-section which is a sector of a cylinder and which has an active surface 42. With the rotor 40 in the position shown in FIG. 6a, the HP bypass path 12a/12b is fully open. In this position both the inlet port 21 and the first outlet port 22 are completely unobstructed by the valve rotor 40, the active surface 42 aligning with edges of the ports 21 and 22. However, as the 40 is rotated to the position shown in FIG. 6b, at which the LP wastegate 12a/12c is opened, the port 21 becomes partially obstructed by the valve rotor 19. Thus, with a valve rotor having the cross-sectional configuration shown in FIGS. 6a and 6b, bypass flow is optimised when the HP bypass path is fully open and the LP wastegate fully closed, but flow efficiency is reduced as the rotor opens the LP wastegate port 23.

FIGS. 6c and 6d correspond to FIGS. 6a and 6b but show an alternative valve rotor configuration 43 having active surface 44. The rotor 43 is again configured as a sector of a cylinder, but has a reduced dimension in a radial direction so that when the rotor 43 is positioned to fully open the HP bypass path 12a/12b, but to block the LP wastegate 12a/12c as shown in FIG. 6c, the flow efficiency though the valve chamber is compromised by the sudden increase in flow path dimension as the gas flows through the port 21. However, with the rotor 43 in the position shown in 6d in which the LP wastegate 12a/12e is also fully open, there is improved flow efficiency compared to that achieved by the rotor of 40, as the 43 does not provide a partial obstruction to the inlet port 21. In this position the active surface aligns with edges of the ports 21 and 23. Thus, the rotor configuration shown in FIGS. 6c and 6d has better flow characteristics than the rotor configuration of FIGS. 6a and 6b when the LP wastegate 12a/12e is open, but not when only the HP bypass path 12a/12b is open.

A valve rotor configuration which provides a compromise between the two valve rotor configurations shown in FIGS. 6a to 6d, having the general configuration of the valve rotor 19 shown in FIG. 4, is shown in FIGS. 6e and 6f (which again correspond to FIGS. 6a/6c and 6b/6d). The modified valve rotor 45 is based on the valve rotor cross-section of the rotor 40 of FIGS. 6a/6b, but with a curvature formed in the active surface 46 at region 46a so that when the rotor 45 is positioned to open both the HP bypass path and the LP waste gate as shown in FIG. 6f the inlet port 21 is less obstructed than it is with the valve rotor 40 as shown in FIG. 6b. Similarly, with the valve rotor 45 in the position shown in FIG. 6e in which only the HP bypass path is open but the LP wastegate is closed, the rotor profile 45 does not provide such a large step increase in flow path size as exhaust gas flows through the port 21 as is exhibited by the valve rotor 43 as shown in FIG. 6c. Accordingly, the valve rotor profile 45 represents a compromise which does not provide quite as good flow efficiency as the rotor 40 when in the position shown in FIGS. 6a and 6e, or the rotor 43 when in the position shown in FIGS. 6d and 6f, but does not suffer the same loss of flow efficiency as the rotor 40 when in the position shown in FIGS. 6b and 6f or the rotor 43 when in the position shown FIGS. 6c and 6e.

It will be appreciated that other valve rotor configurations are possible, and that other compromises may be preferable in other embodiments. It will also be appreciated that the precise positioning, size and configuration of the valve ports may vary and that this may have a bearing on the design of the valve rotor.

A turbocharger system according to the present invention comprising an LP turbocharger including an LP turbine as shown in FIG. 3 connected to an HP turbocharger is illustrated in FIG. 7. Many features of the turbocharger system are visible in FIG. 7 including LP turbine housing 30, LP turbine outlet 35, exhaust control valve housing 31, valve spindle 32, manifold 33 for connection to the engine exhaust gas manifold, manifold 34 connected to the inlet of the HP turbine 4, LP turbine inlet 36 for connection to the HP outlet, LP compressor 7, HP compressor 5, and compressor bypass valve housing 14.

The turbocharger system of the present invention may be incorporated in an engine with an exhaust gas recirculation (EGR) system. In an EGR system a portion of the exhaust gas taken from the exhaust manifold is reintroduced into the inlet manifold of the engine for further combustion with a view to reducing engine emissions. Incorporation of the turbocharging system of FIG. 1 (or FIG. 7) in an engine including an EGR system is schematically illustrated in FIG. 8. The illustrated EGR system includes an EGR recirculation path 50 flowing a portion of the exhaust gas to the intake manifold 16 of the engine 3 via an EGR cooler 51. Flow through the exhaust recirculation path 50 is controlled by an EGR control valve 52. The EGR control valve 52 may be any one of a variety of conventional types commonly used in such an application, including butterfly valves, flap valves, rotary valves etc.

With modern highly efficient turbocharger systems, the boost pressure of the inlet manifold can often exceed the exhaust gas pressure at the exhaust manifold making the reintroduction of the recirculated exhaust gas to the inlet manifold problematical, for instance requiring dedicated EGR pumps etc. In some embodiments of the invention, the exhaust gas control valve could be operated in such a way as to effectively reduce turbocharging efficiency below the maximum that could be achieved for a given engine operating condition in order to maintain back pressure at a level necessary to facilitate exhaust gas recirculation. In other words, the exhaust control valve 11 may be operated in such a way as to optimise engine intake and exhaust manifold conditions for exhaust gas recirculation in order to reduce emissions whilst at the same time minimising the air-fuel ratio for better fuel consumption.

In the embodiment of the invention illustrated in FIG. 3 the valve 11 is conveniently located in a modified LP turbine housing. It will be appreciated that in alternative embodiments of the invention the exhaust flow control valve may be housed in a separate valve housing which is not part of either of the two turbochargers. Such an embodiment may for instance allow retrofitting of the control valve 11 to a two-stage turbocharging system. In yet other embodiments, the HP turbine and LP turbines may be combined in a common housing, the exhaust control valve being located within that common turbine housing.

Turbines may be of a fixed or variable geometry type. Variable geometry turbines differ from fixed geometry turbines in that the size of the inlet passageway can be varied to optimise gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level which ensures efficient turbine operation by reducing the size of the annular inlet passageway. Turbochargers provided with a variable geometry turbine are referred to as variable geometry turbochargers.

In one known type of variable geometry turbine, an axially moveable wall member, generally referred to as a "nozzle ring", defines one wall of the inlet passageway. The position of the nozzle ring relative to a facing wall of the inlet passageway is adjustable to control the axial width of the inlet passageway. Thus, for example, as gas flow through the turbine decreases, the inlet passageway width may be decreased to maintain gas velocity and optimise turbine output.

Another known type of variable geometry turbine is the "swing vane" type. This comprises a variable guide vane array with adjustable guide vanes located in the turbine inlet passageway. Each vane is pivotable about a respective pivot axis extending across the inlet parallel to the turbine axis. A vane actuating mechanism is provided which is linked to each of the vanes and is displaceable in a manner which causes each of the vanes to move in unison, such a movement enabling the cross-sectional area of the inlet, and also the angle of approach of the gas turbine wheel, to be controlled.

Although two stage turbocharging systems comprising fixed geometry turbines may in some respects provide an alternative to the use of relatively complex and expensive variable geometry turbochargers, one (or even both) of the turbochargers of a two stage turbocharging system according to the present invention could be a variable geometry turbocharger (of any type). This may be desirable for instance to further improve control over the turbocharging system and the ability to optimise turbocharging performance across a wide range of engine conditions.

In the above described embodiments of the invention there is a single HP turbine. However, it will be appreciated that a turbocharging system according to the present invention could for instance include two parallel HP turbines. For example, each of two HP turbines could receive an exhaust gas flow from a respective bank of cylinders from a multi-cylinder engine (for instance each receiving exhaust gas from one bank of a "V" configured engine). In such an embodiment the outlets for each HP turbine could be combined upstream of a single LP turbine, and a single exhaust control valve 11 according to the present invention provided in which the HP bypass path 12a/12b communicates between the exhaust path 9 upstream of the two HP turbines, and with the exhaust gas path 9 upstream of the LP turbine but after the two HP turbine outlets are combined.

In embodiments comprising more than one HP turbine, HP turbines can be linked to a common HP compressor or to separate respective HP compressors.

Alternatively, rather than providing two separate HP turbines to receive exhaust gas flow from two separate banks of engine cylinders, a single twin entry HP turbine could be included in a turbocharger system according to the present invention. Moreover, in a turbocharger system according to the present invention comprising one or more HP turbines, each of the HP turbines could be configured as a twin-entry turbine.

Similarly, it will be appreciated that a turbocharging system in accordance with the present invention could have more than one set of sequentially connected turbochargers operating in parallel. For instance, a first turbocharging system generally as described above could receive an exhaust gas flow from a first set of cylinders of a multi-cylinder combustion engine, and a second sequential turbocharging arrangement as described above could receive exhaust gas flow from a second set of cylinders of the engine (each "set" could comprise a single cylinder).

It will further be appreciated that the present invention is not limited to a two stage sequential turbocharging system, but could be embodied in a turbocharging system comprising more than two turbine stages connected in series.

The turbocharger system of the present invention may also comprise an engine braking valve, as shown schematically in FIG. 9. The exhaust brake valve 53 is situated in the first exhaust passage 9. As will be appreciated by those skilled in the art, the exhaust brake valve 53 is a valve situated downstream of the engine outlet manifold 8. Under certain engine operating conditions the valve 53 may be closed to restrict flow through the valve 53. The restriction of flow through the valve 53 constrains the flow of exhaust gases from the engine outlet manifold 8 and, as such, creates back-pressure in the engine manifold 8 and engine cylinders due to compression of the exhaust gases. The back-pressure results in a braking force being applied to the engine 3.

In FIG. 9 the exhaust brake valve 53 is shown situated upstream of the first exhaust turbine 4 and downstream of a junction 54 communicating with the inlet port 21 of the exhaust gas flow control valve 11. Alternatively, the exhaust brake valve 53 may be situated upstream of junction 54 (shown dashed and indicated as A). As a further alternative the exhaust brake valve 53 may be situated downstream of the first exhaust turbine 4 and upstream of a junction 55 communicating with the first outlet 22 of the exhaust gas flow control valve 11 (shown dashed and indicated as B). As another alternative, the exhaust brake valve 53 may be situated downstream of junction 55 and upstream of the second exhaust turbine 6 (shown dashed and indicated as C). As a further alternative, the exhaust brake valve 53 may be situated downstream of the second exhaust turbine 6 and upstream of a junction 56 communicating with the second outlet 23 of the exhaust gas flow control valve 11 (shown dashed and indicated as D). As a still further alternative, the exhaust brake valve 53 may be situated downstream of junction 56 (shown dashed and indicated as E).

Known exhaust brake valves may be used in accordance with the present invention at positions A or E. Such exhaust brake valves may be of any appropriate type known in the art and controlled and actuated in any appropriate way known in the art. As such further discussion of the operation of exhaust brake valves used in positions A and E is omitted, suffice to say that modulating the flow through the engine brake valve allows the braking force applied to the engine 3 to be controlled. It will be appreciated that under certain conditions, when it is undesirable to expose either the HP turbine 4 or LP turbine 6 to high back pressure, it is advantageous to position the engine braking valve at position A.

If the exhaust braking valve 53 is positioned as it is shown in FIG. 9, or in positions B, C or D, the valve 53 may be separate from the turbine housing 30 or may be integrated therewith, as shown in FIG. 10. The turbine housing shown in FIG. 10 is structurally very similar to that shown in FIG. 3. As such, corresponding features have been numbered accordingly. In the embodiment of the invention shown in FIG. 10 the exhaust brake valve 53 has been positioned such that it corresponds with B in FIG. 9. The exhaust braking valve 53 is secured in a gas-tight manner intermediate part of the LP inlet manifold 36 and a pipe 57 which is connected at its other end to the outlet of the HP turbine 4. It will be appreciated that whilst the exhaust braking valve 53 is located schematically at position B in FIG. 9, it may be physically located either at the outlet of the HP turbine 4, at the inlet of the LP turbine 6, or (as shown) in a pipe linking the outlet of the HP turbine 4 and the inlet of the LP turbine 6.

FIGS. 11 and 12 show the same embodiment of the invention as shown in FIG. 10, but with portions of the pipe 57, control valve housing and valve rotor 19 cut away for clarity. It can be seen that the exhaust brake valve 53 comprises a butterfly flap 58 which is driven by an actuator 59. The actuator may be electrically operated, hydraulically operated, pneumatically operated or operated by any other appropriate power source. Furthermore, the actuator may be mounted directly to the interstage pipe 57, mounted directly to the turbine housing 30 or may be fixed by a bracket (not shown). The state of the actuator 59, and hence the position of the butterfly flap 58 may be controlled by an Engine Control Unit (ECU).

Although a butterfly type exhaust brake valve 53 is shown, it will be appreciated that any appropriate valve type, such as rotary valve, guillotine valve or conventional flap valve, could be used.

In a normal operating state of the engine, when no exhaust braking is required, the valve 59 operates in an open position, as shown in FIG. 11. When the valve 59 is in open position the butterfly flap 58 is orientated such that it is substantially parallel to the direction of gas flow through the pipe 57. As such, flow through the exhaust brake valve 53 is at least substantially unobstructed. The size and shape of the pipe 57 and butterfly flap 58 may be optimised so as to minimise any flow loss which occurs due to the presence of the butterfly flap 58 in the flowpath.

In an exhaust braking mode of the engine, in which exhaust braking is required, the valve 59 operates in a closed position shown in FIG. 12. When the valve 59 is in the closed position the butterfly flap 58 is orientated such that it substantially lies across pipe 57. As such, flow through the exhaust brake valve 53 is at least substantially prevented, as the butterfly flap 57 substantially blocks the pipe 57.

When the exhaust brake valve 53 is in its closed position, the exhaust gas flow control valve 11 operates in an exhaust braking mode to allow at least a portion of the exhaust gas flow to bypass the exhaust brake valve 53 to thereby modulate the braking force. In known exhaust brakes, the braking force applied to the engine is controlled by to what degree exhaust flow is restricted by the exhaust brake valve. The greater the restriction in exhaust flow, the greater the braking force. As a result the exhaust brake valve must be capable of changing the restriction to the exhaust flow which it provides. Such exhaust brake valves tend to be heavy, due to their required robust nature, and complex to control and operate. On the contrary, the exhaust brake valve 53 of the proposed invention need only operate in open and closed positions. The exhaust brake valve 53 does not need to change the restriction to exhaust flow which it provides. Instead, the exhaust brake valve 53 is closed and the braking force applied to the engine is controlled by using the exhaust gas flow control valve 11 to modulate the amount of exhaust gas flow allowed to bypass the exhaust brake valve 53. In this way the exhaust brake valve 53 of the proposed invention can have simpler control requirements and be smaller and lighter compared to know exhaust brake valves.

Modulating the amount of exhaust gas flow allowed to bypass the exhaust brake valve 53 is achieved by regulating the exhaust gas flow through any of: the inlet port 21 of the exhaust gas flow control valve 11; the first outlet port 22 of the exhaust gas flow control valve 11; and the second outlet port 23 of the exhaust gas flow control valve 11. This is accomplished by controlling the position of the of the exhaust gas control valve rotor 19 as discussed above.

In the embodiment of the invention shown in FIG. 12, where the exhaust brake valve is in a closed position, exhaust gas flow from the HP turbine 4 to the LP turbine 6 via pipe 57 is substantially prevented as the butterfly flap 58 substantially blocks the pipe 57. In this situation the exhaust gas flow control valve 11 operates in an exhaust braking mode. As is discussed further below, the position of the exhaust gas flow control valve rotor 19 can modulate the amount of exhaust gas which bypasses the exhaust braking valve 53 by controlling which ports, and to what extent, are open within the exhaust gas flow control valve 11. As shown in FIG. 12, the rotor is in a position which completely covers port 23 and substantially covers port 22. With the rotor 19 in this position exhaust flow from the first exhaust passage 9, via manifold 33, bypass path 12a, valve 11 and bypass path 12b to the LP turbine 6 is substantially restricted due to port 22 being substantially closed by rotor 19. With substantially restricted bypass flow, the exhaust braking force applied to the engine is relatively high. Should the rotor 19 be rotated anti-clockwise as it is seen in FIG. 12, port 22 will become substantially uncovered whilst port 23 remains covered. In this situation exhaust flow from the first exhaust passage 9, via manifold 33, bypass path 12a, valve 11 and bypass path 12b to the LP turbine 6 is substantially unrestricted. As such, exhaust gas can bypass the exhaust brake valve 53 and so the braking force applied to the engine is relatively low. In this manner, by rotating the rotor 19 to control the degree to which the port 22 is covered/uncovered, it is possible to modulate the amount of exhaust gas which can bypass the exhaust brake valve 53 and hence control the braking force applied to the engine 3.

Exemplary modes of operation of the exhaust gas flow control valve 11 whilst in an exhaust braking mode are described below with reference to FIGS. 13a to 13e.

Figure 13A:
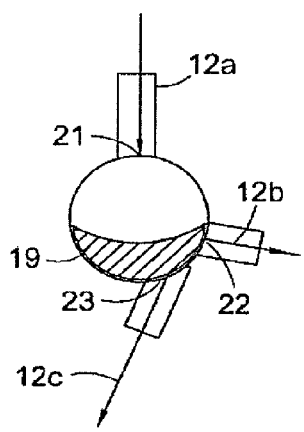

Referring first to FIG. 13a, this illustrates a position of the valve rotor 19 whereby both the first outlet port 22 and second outlet port 23 are closed by the valve rotor 19. With the rotor 19 in this position, no exhaust gas can flow through the exhaust gas flow control valve 11 and hence no exhaust gas can bypass the exhaust brake valve 53. The positioning of the rotor 19 in this case is suitable for when maximum exhaust braking is required. This mode of operation of the exhaust gas flow control valve 11 will function in the same way regardless as to whether the exhaust brake valve 53 is located as it is in FIG. 9, or in any of locations B, C or D.

Figure 13B:
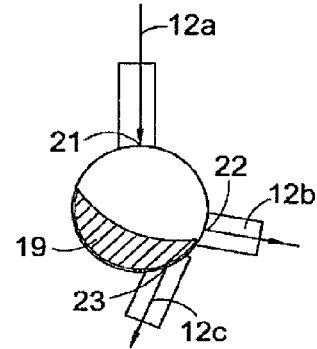

FIG. 13b shows the valve rotor 19 rotated to a position in which the port 22 is completely uncovered but port 23 remains covered. By controlling the position of the valve rotor 19 between the two positions shown in FIGS. 13a and 13b, it is possible in accordance with the present invention to modulate the exhaust brake valve 53 bypass gasflow through the bypass gas path 12a/12b. This mode of operation of the exhaust gas flow control valve 11 will function to control the engine braking force applied to the engine if the engine braking valve is located as it is in FIG. 9 or in location B.

Figure 13C:
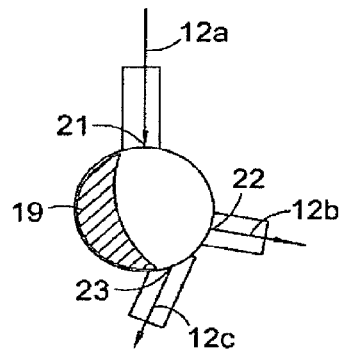

FIG. 13c shows the valve rotor 19 rotated to a position in which the port 22 is completely uncovered and port 23 is partially uncovered. By controlling the position of the valve rotor 19 between the two positions shown in FIGS. 13a and 13b, it is possible in accordance with the present invention to modulate the amount of exhaust gas which flows through the bypass path 12a/12c. In some embodiments of the invention the cross-sectional area of the bypass path 12c is much less than that of 12b. In this situation, controlling the precise position of the rotor 19 to vary the degree to which the port 23 is uncovered will have little effect as due to the fact that the larger port 22 is fully open, most of the gas will flow through port 22. In this situation, should the exhaust brake valve 53 be located as it is in FIG. 9 or at location 13, due to the fact that port 22 is fully open, maximum exhaust gasflow will occur through bypass path 12a/12b therefore resulting in a maximum bypass of the exhaust brake valve 53 and hence minimum exhaust braking force. It will be appreciated that, should the exhaust brake valve 53 be located at locations C or D, and if the cross-section of bypass path 12c is large enough, it may be possible to modulate the exhaust brake valve 53 bypass gasflow through the bypass gas path 12a/12c in a similar way to that described above.

Figure 13D:
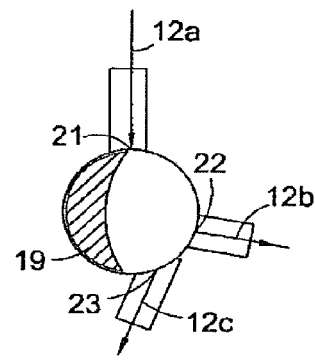

FIG. 13d shows the valve rotor 19 rotated to a position in which both ports 22 and 23 are completely uncovered but port 21 is partially covered. By controlling the position of the valve rotor 19 between the two positions shown in FIGS. 13c and 13d, it is possible in accordance with the present invention to modulate the exhaust brake valve 53 bypass gasflow through the bypass gas path 12a/12b and 12a/12c. The greater the port 21 is covered, the greater the restriction to the bypass paths 12a/12b and 12a/12c, and hence the less exhaust gas can bypass the exhaust brake valve 53, resulting in greater exhaust braking force. This mode of operation of the exhaust gas flow control valve 11 will function to control the engine braking force applied to the engine if the engine braking valve 53 is located as it is in FIG. 9 or in any of locations B C and D.

Figure 13E:
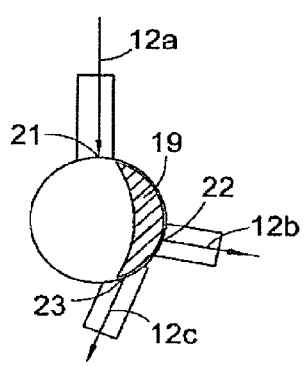

FIG. 13e shows the valve rotor 19 rotated to a position in which port 21 is completely uncovered, port 22 is completely covered and port 23 is partially covered. By controlling the position of the valve rotor 19 between the two positions shown in FIGS. 13d and 13e, it is possible in accordance with the present invention to modulate the exhaust brake valve 53 bypass gasflow through the bypass gas path 12a/12c. The greater the port 23 is covered, the greater the restriction to the bypass path 12a/12c, and hence the less exhaust gas can bypass the exhaust brake valve 53, resulting in greater exhaust braking force. This mode of operation of the exhaust gas flow control valve 11 may function to control the engine braking force applied to the engine if the engine braking valve 53 is located at locations C and D; and if the cross section of the bypass flow path 12c is large enough to accommodate a substantial bypass exhaust flow.

Other applications and modifications of the invention as described above will be apparent to the appropriately skilled person

The invention claimed is:

1. A turbocharger system comprising:
   a first turbocharger;
   a second turbocharger larger than the first turbocharger;
   the first turbocharger comprising a first exhaust turbine situated in an exhaust passage;
   the second turbocharger including a second exhaust turbine situated in said exhaust passage downstream of said first exhaust turbine;
   an exhaust gas flow control valve including:
      an inlet port communicating with the exhaust gas passage upstream of the first exhaust turbine;
      a first outlet port communicating with the exhaust gas passage downstream of said first exhaust turbine but upstream of said second exhaust turbine; and
      a second outlet port communicating with the exhaust gas passage downstream of said second exhaust turbine;
      wherein the exhaust gas flow control valve is operable to selectively permit or block flow through the first and second outlet ports; and wherein the exhaust gas flow control valve is operable in at least three operating modes:
   a first mode to block flow through both the first and second outlet ports;
   a second mode in which flow is permitted through both the inlet port and the first outlet port to allow at least a portion of the exhaust gas flow to bypass the first exhaust turbine alone; and
   a third mode in which flow is permitted through both the inlet port and the second outlet port to allow at least a portion of the exhaust gas flow to bypass both the first and second exhaust turbines.

2. A turbocharger system according to claim 1, wherein in said second mode the first outlet port is at least partially unobstructed and the second outlet port is fully obstructed.

3. A turbocharger system according to claim 2, wherein in said second mode the exhaust gas flow control valve is operable to vary the amount to which the first outlet port is unobstructed.

4. A turbocharger system according to claim 1, wherein in said third mode exhaust gas flow is also permitted through the first outlet port.

5. A turbocharger system according to claim 4, wherein in said third mode the inlet port is fully unobstructed, the first outlet port is fully unobstructed and the second outlet port is at least partially unobstructed.

6. A turbocharger system according to claim 5, wherein in said third mode the second outlet port is fully unobstructed.

7. A turbocharger system according to claim 5, wherein in said third mode the exhaust gas flow control valve is operable to vary the amount to which the second outlet port is unobstructed.

8. A turbocharger system according to claim 1, wherein the inlet port is at least substantially unobstructed in each of said first, second and third modes.

9. A turbocharger system according to claim 1, wherein the second outlet port communicates with said exhaust passage via a bypass passage that is sized to flow only a portion of the total exhaust gas flow when both the first and second valve outlet ports are fully unobstructed.

10. A turbocharger system according to claim 1, wherein the exhaust gas flow control valve is housed within a housing of the second exhaust turbine.

11. A turbocharger system comprising:
a first turbocharger;
a second turbocharger larger than the first turbocharger;
the first turbocharger comprising a first exhaust turbine situated in an exhaust passage;
the second turbocharger including a second exhaust turbine situated in said exhaust passage downstream of said first exhaust turbine;
an exhaust gas flow control valve including:
an inlet port communicating with the exhaust passage upstream of the first exhaust turbine;
a first outlet port communicating with the exhaust gas passage downstream of said first exhaust turbine but upstream of said second exhaust turbine; and
a second outlet port communicating with the exhaust gas passage downstream of said second exhaust turbine;
wherein the exhaust gas flow control valve is operable to selectively permit or block flow through the first and second outlet ports; and
wherein the exhaust flow control valve is a rotary valve comprising a valve rotor that is rotatable about a valve axis to selectively block or unblock said first and second outlet ports; and
wherein the valve rotor is rotatable between a first position in which both the first and second outlet ports are fully blocked; a second position in which the inlet port is unblocked, the first outlet port is at least partially unblocked and the second outlet port is fully blocked, and a third position in which the inlet port is unblocked, the first outlet port is unblocked and the second outlet port is at least partially unblocked.

12. A turbocharger system according to claim 11, wherein when the valve rotor is in said third position the second outlet port is fully unblocked.

13. A turbocharger system according to claim 11, wherein the valve rotor is selectively positionable at a plurality of positions between said first and second positions.

14. A turbocharger system according to claim 11, wherein the valve rotor is selectively positionable at a plurality of positions between said second and third positions.

15. A turbocharger system according to claim 11, wherein said valve rotor is selectively positionable at any position between said first, second and third positions.

16. A turbocharger system according to claim 11, wherein the valve rotor is rotatable to one of a plurality of second positions that differ in the amount to which the first outlet port is unblocked.

17. A turbocharger system according to claim 11, wherein the valve rotor is rotatable to one of a plurality of third positions that differ in the amount to which the second outlet port is unblocked.

18. A method of operating a turbocharger system comprising:
a first turbocharger;
a second turbocharger larger than the first turbocharger;
the first turbocharger comprising a first exhaust turbine situated in a first exhaust passage;
the second turbocharger including a second exhaust turbine situated in said first exhaust passage downstream of said first exhaust turbine;
an exhaust gas flow control valve including:
an inlet port communicating with the first exhaust gas passage upstream of the first exhaust turbine;
a first outlet port communicating with the first exhaust gas passage downstream of said first exhaust turbine but upstream of said second exhaust turbine; and
a second outlet port communicating with said first exhaust gas passage downstream of said second exhaust turbine;
wherein the exhaust gas flow control valve is operable to selectively permit or block flow through the first and second outlet ports
the method comprising:
operating the exhaust gas flow control valve in a first mode to divert all exhaust gas flow through the first exhaust turbine;
operating the exhaust gas flow control valve in a second mode to allow at least a portion of the exhaust gas flow to bypass the first exhaust turbine; and
operating the exhaust gas flow control valve in a third mode to allow exhaust gas flow to bypass the first exhaust turbine, and in addition to allow at least a portion of the exhaust gas flow to bypass the second exhaust turbine.

19. A method according to claim 18, wherein in said second mode the exhaust gas flow control valve is operated to modulate the amount of exhaust gas flow allowed to bypass the first exhaust turbine.

20. A method according to claim 18, wherein in said third mode the exhaust gas flow control valve is operated to modulate the amount of exhaust gas flow allowed to bypass the second exhaust turbine.

21. A method according to claim 18, wherein the exhaust gas flow control valve is operated in said third mode to control boost pressure generated by the second turbocharger.

22. A method according to claim 21, wherein the exhaust gas flow control valve is operated in said third mode to allow exhaust gas flow to bypass the second exhaust turbine when the boost pressure generated by the second turbocharger reaches a predetermined limit.

23. A method according to claim 18, wherein the exhaust gas flow control valve is operated in said third mode to control the rotational speed of the second turbocharger.

24. A method according to claim 23, wherein the exhaust gas flow control valve is operated in said third mode when the rotational speed of the second turbocharger reaches a predetermined limit.

* * * * *